(12) United States Patent
Kaufman et al.

(10) Patent No.: US 7,848,475 B2
(45) Date of Patent: Dec. 7, 2010

(54) LOW HEAD LOSS MODULAR SUCTION STRAINER WITH CONTOURED SURFACES

(75) Inventors: Andrew E. Kaufman, West Windsor, NJ (US); Alan J. Bilanin, Princeton, NJ (US)

(73) Assignee: Continuum Dynamics, Inc., Ewing, NJ (US)

(*) Notice: Subject to any disclaimer, the term of this patent is extended or adjusted under 35 U.S.C. 154(b) by 262 days.

(21) Appl. No.: 11/596,097

(22) PCT Filed: May 3, 2005

(86) PCT No.: PCT/US2005/015178

§ 371 (c)(1),
(2), (4) Date: Dec. 27, 2007

(87) PCT Pub. No.: WO2005/113108

PCT Pub. Date: Dec. 1, 2005

(65) Prior Publication Data

US 2008/0223779 A1    Sep. 18, 2008

Related U.S. Application Data

(60) Provisional application No. 60/570,802, filed on May 14, 2004.

(51) Int. Cl.
  *G21C 9/00*    (2006.01)
  *G21C 19/30*   (2006.01)
  *B01D 29/07*   (2006.01)
  *B01D 39/08*   (2006.01)
  *B01D 39/12*   (2006.01)

(52) U.S. Cl. .................. 376/282; 210/346; 210/347; 210/416.1; 210/486; 210/487; 210/488; 210/498; 376/313

(58) Field of Classification Search .............. 210/346, 210/347, 416.1, 460, 468, 487, 488, 498; 376/282, 283, 313
See application file for complete search history.

(56) References Cited

U.S. PATENT DOCUMENTS 3,709,293 A    1/1973    Layne, II et al.
(Continued)

FOREIGN PATENT DOCUMENTS

EP    0 970 477        12/2001
WO   WO 2005/113108    12/2005

OTHER PUBLICATIONS

Sulzer Thermtec, Nuclear Service and Valves—Suction strainers with stringent requirements for the emergency cooling systems of nuclear power plants, 4 pp. Aug. 1995.
(Continued)

*Primary Examiner*—John Kim
(74) *Attorney, Agent, or Firm*—David M. Quinlan, P.C.

(57) ABSTRACT

A strainer for an emergency core cooling system (ECCS) in a nuclear power plant comprises a perforated strainer element that is immersed in a reservoir of cooling water, which is drawn through the strainer element into the emergency core cooling system. The side of the strainer element in contact with the cooling water has a contoured configuration for disrupting the formation of a flat bed of fibrous material that can trap small particulate material intended to pass through the strainer element. Incorporating this strainer element into an ECCS strainer enables the strainer to be made more compact, because the debris bed need not be spread over an unduly large area to prevent excessive head loss from the debris load in the event of a reactor loss of coolant accident. The strainer also incorporates a modular construction that uses individual strainer disc modules. Each disc module includes a perforated first disc part having a central opening and a perforated second disc part also having a central opening. The first and second disc parts fit together to form an interior space with facing perforated major surfaces and an axial opening, and connecting tubes between the discs place the axial openings in fluid communication. The entire assembly is secured together by tie rods that hold the discs together with the connecting tubes compressed between them.

26 Claims, 6 Drawing Sheets

U.S. PATENT DOCUMENTS

| | | | |
|---|---|---|---|
| 4,376,091 A | | 3/1983 | Netkowicz et al. |
| 4,501,663 A | * | 2/1985 | Merrill ........................ 210/347 |
| 5,330,644 A | * | 7/1994 | Nilsson ................... 210/323.1 |
| 5,471,514 A | | 11/1995 | Soderlund |
| 5,473,649 A | | 12/1995 | Olsson et al. |
| 5,696,801 A | | 12/1997 | Dwyer et al. |
| 5,759,398 A | | 6/1998 | Kielbowicz |
| 5,759,399 A | | 6/1998 | Bilanin et al. |
| 5,835,549 A | | 11/1998 | Sibiga |
| 5,935,439 A | | 8/1999 | Hart et al. |
| 6,117,322 A | | 9/2000 | Miller et al. |
| 6,175,606 B1 | | 1/2001 | Soderberg |

OTHER PUBLICATIONS

International Search Report in PCT/US05/15178, Nov. 8, 2005.
Letter In Response To Written Opinion With Amendments Under Article 34 in PCT/US2005/15178, Mar. 14, 2006.
International Preliminary Report On Patentability and Written Opinion in PCT/US05/15178, Dec. 15, 2006.

* cited by examiner

LOW HEAD LOSS MODULAR SUCTION STRAINER WITH CONTOURED SURFACES

CROSS-REFERENCE TO RELATED APPLICATIONS

This application claims the benefit of U.S. provisional application No. 60/570,802, filed May 14, 2004.

BACKGROUND OF THE INVENTION

1. Field of the Invention

The present invention relates to a suction strainer to remove entrained solids from the cooling liquid in a nuclear reactor, and more particularly, to a suction strainer of modular construction with a contoured surface configuration that reduces head loss across the strainer in the presence of liquids with entrained debris.

2. Description of Related Art

A nuclear power plant typically includes an emergency core cooling system (ECCS) that circulates large quantities of cooling water to critical reactor areas in the event of accidents. A boiling water reactor (BWR) commonly draws water from one or more reservoirs, known as suppression pools, in the event of a loss of coolant accident (LOCA). Water is pumped from the suppression pool to the reactor core and then circulated back to the suppression pool. A LOCA can involve failure of reactor components that introduce large quantities of solid matter into the cooling water, which entrains the solids and carries them back to the suppression pool. For example, if a LOCA results from the rupture of a high pressure pipe, quantities of thermal insulation, concrete, paint chips and other debris can be entrained in the cooling water. A pressurized water reactor (PWR) after a LOCA typically draws cooling water from a reactor water storage tank (RWST), and then after a signal, shuts off the flow from the RWST and recirculates this water through the reactor. That is, a PWR has a containment area that is dry until it is flooded by the occurrence of an accident, and the ECCS uses pump connected to a sump in the containment area to circulate the water through the reactor. Nevertheless, the water that is pumped in the event of a PWR accident will also usually contain entrained solids that typically includes insulation, paint chips, and particulates. In other words, in both types of reactor, cooling water is drawn from a reservoir and pumped to the reactor core, and entrained solids can impair cooling and damage the ECCS pumps if permitted to circulate with the water.

As a result, strainers are typically placed in the coolant flow path upstream of the pumps, usually by immersing them in the cooling water reservoir. It is critical that these strainers be able to remove unacceptably large solids without unduly retarding the flow of coolant; in other words, the pressure (head) loss across the strainer must be kept to a minimum. Strainers are commonly mounted to pipes that are part of the ECCS and that extend into the suppression pool (BWR) or sump (PWR), and the ECCS pumps draw water through the strainers and introduce it to the reactor core. There has been considerable effort expended on the design of strainers to decrease head loss across the strainer for the design coolant flow. These strainers typically include a series of stacked perforated hollow discs (BWRs) or flat perforated plates (PWRs) and a central core through which water is drawn by the ECCS pump. The perforated discs prevent debris larger than a given size from passing the strainer perforations and reaching the pumps. An example of a particularly effective strainer design is the present inventors' U.S. Pat. No. 5,759,399, which is assigned to the same assignee as the present invention and is incorporated herein by reference (as discussed in detail below).

Large amounts of fibrous material can enter the circulating coolant water in the event of a reactor accident. This fibrous material, which originates with reactor pipe or component insulation that is damaged and enters the ECCS coolant stream in the event of a LOCA, accumulates on the strainer surfaces and captures fine particulate matter in the flow. The resulting fibrous debris bed on the strainer surfaces can quickly block the flow through the strainer, even though the trapped particulates may be small enough to pass through the strainer perforations. Heretofore, this flow blockage effect has been addressed by making the strainer larger, the goal being to distribute the trapped debris over more area, reduce the velocity through the debris bed, and thus reduce the head loss across the strainer as a whole. This is, however, an imperfect solution, both because the available space in a reactor for suction strainers is usually limited, and because larger strainers are more costly. Accordingly, it is possible that the expected debris load after a LOCA can dictate strainers that are too large for the space allotted for them in the containment area. Moreover, larger strainers are more difficult to work with and thus more costly to install.

Prior art ECCS strainers have also been constructed in ways that can make them somewhat expensive to fabricate. As a result of all of the above factors, it has proven difficult to reduce the costs of strainers for a nuclear power plant ECCS to any meaningful degree and to provide strainers that fit within the space constraints.

SUMMARY OF THE INVENTION

It is an object of the present invention to provide an ECCS strainer that overcomes the above disadvantages of the prior art.

In accordance with a first aspect of the invention, a strainer for an emergency core cooling system for a nuclear power plant comprises a strainer element for immersion in a reservoir of cooling water utilized by the emergency core cooling system, the strainer element having at least one major surface with perforations therethrough; and a suction opening operatively connected to an internal side of the major surface for drawing cooling water into the emergency core cooling system through the perforations from an external side of the major surface in contact with the cooling water, wherein at least a portion of the external side of the major surface includes a contoured configuration for disrupting the formation of a flat bed of material that can trap particulate material small enough to pass through the perforations.

More specifically, the contoured configuration according to this aspect of the invention can assume a variety of embodiments. It can comprise a wire mesh cloth covering the strainer element. It can also comprise a plurality of protrusions, which may be substantially uniform and raised above the external side of the major surface in a regular repeating pattern and may also be substantially hemispherical in cross section. The contoured configuration can further comprise a plurality of substantially uniform depressions alternating in the pattern with the protrusions, which depressions are substantially hemispherical. Yet another embodiment of the contoured configuration comprises a plurality of substantially similar corrugations in the strainer element.

In accordance with another aspect of the invention, a modular strainer comprises a plurality of hollow strainer discs disposed in a stack along an axis with a major surface of one disc facing a major surface of an adjacent disc, each disc including a first disc part with perforations therethrough and having an opening and a second disc part with perforations therethrough and having an opening, wherein the first and second disc parts fit together to form an interior space with facing perforated major surfaces and an opening formed at the axis by the openings in the disc parts, a plurality of connecting tubes placing the openings of the discs in fluid communication, at least one structural member securing the strainer discs together and holding the connecting tubes in place between the strainer discs, and a pipe in fluid communication with the opening of the strainer disc at one end of the stack. In one embodiment of the invention, the axis is centrally located in the discs.

In a modular strainer in accordance with this aspect of the invention, each strainer disc can include a core flow regulator extending between the first and second disc parts for regulating fluid flow from the interior space to an axis of the strainer. In addition, the core flow regulator may comprise a tubular core boss secured in the openings of the disc parts and having at least one aperture placing the interior space in fluid communication with a strainer core formed by the tubular core bosses and connecting tubes. In a particularly advantageous arrangement, the aperture is smaller in the core boss in strainer discs further from the one end of the stack than in an adjacent strainer disc closer to the one end of the stack. The axis can also be located generally in the center of the discs.

Moreover, a modular strainer in accordance with this aspect of the invention may further incorporate the first aspect of the invention, wherein the facing major surfaces of adjacent discs essentially comprise strainer elements with contoured configurations as discussed above.

BRIEF DESCRIPTION OF THE DRAWINGS

The objects of the invention will be better understood from the detailed description of its preferred embodiments which follows below, when taken in conjunction with the accompanying drawings, in which like numerals refer to like features throughout. The following is a brief identification of the drawing figures used in the accompanying detailed description.

DETAILED DESCRIPTION OF THE PREFERRED EMBODIMENTS

Figure 1:
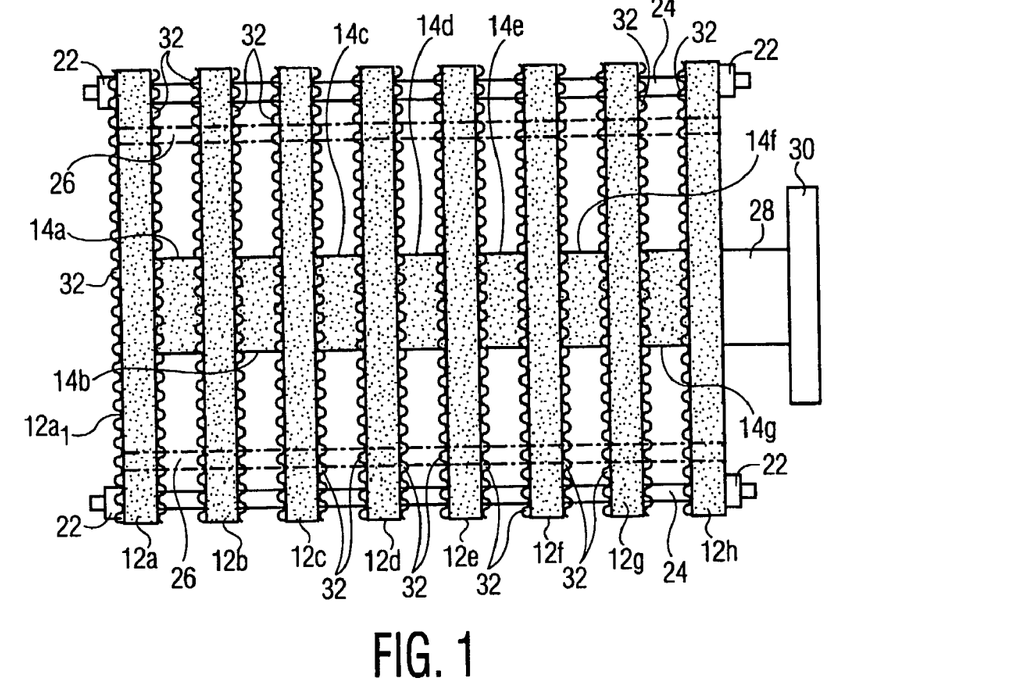
FIG. 1 is a schematic side view of a completed modular ECCS strainer having a contoured surface in accordance with an embodiment of the invention that reduces head loss across the strainer in the presence of fibrous and particulate materials in the ECCS flow.
Figure 2:
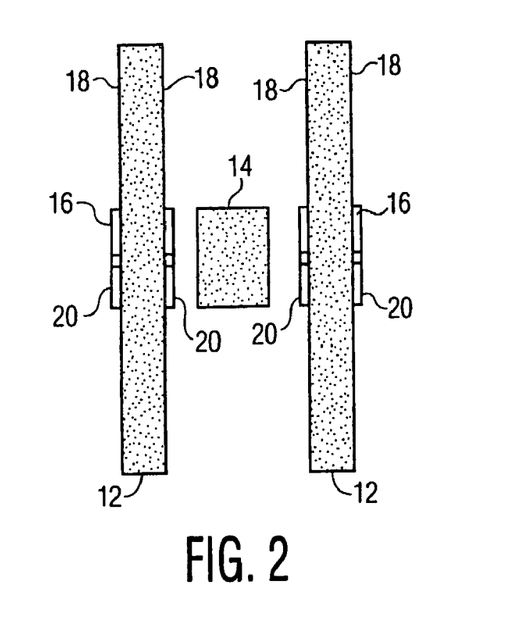
FIG. 2 is an exploded side view of a portion of an ECCS strainer such as that shown in FIG. 1, constructed as a modular unit in accordance with another embodiment of the invention.

FIGS. 1 and 2 schematically illustrate a stacked-disc ECCS strainer 10 in accordance with a preferred embodiment of the invention. The strainer shown in FIG. 1 includes a series of hollow discs 12a, 12b, 12c, 12d, 12e, 12f, 12g and 12h with their major surfaces in mutually facing relationship. The disc configuration and construction is described in detail below in connection with FIG. 3, but suffice it to say here that each disc 12 has central opening that is in placed in fluid communication with the central opening of an adjacent disc through one of a plurality of connecting tubes 14a, 14b, 14c, 14d, 14e, 14f and 14g. The discs 12 and the tubes 14 have perforated walls in accordance with conventional strainer design. That is, the disc and connecting tube surfaces are perforated with openings large enough to permit the passage of fluid but small enough to strain particulate material with diameters less than the design specification of the strainer. Typically, the perforations are on the order of ⅛ in. across, although in some instances they can be as small as 0.04 to 0.08 in., and are circular for ease of fabrication. While the construction of the strainer 10 is unique, the general principles underlying its operation are the same as those set forth in the discussion regarding the general operation and application of nuclear reactor suction strainers in the aforementioned U.S. Pat. No. 5,759,399, which discussion is incorporated by reference herein as if set out in full.

FIG. 2 illustrates in more detail the modular nature of the design of the strainer 10 of this embodiment of the invention. In that regard, each disc 12 is essentially self-contained and has a tubular core boss 16 extending through the disc. As noted above, the plural hollow discs 12 are assembled with the external sides of their major surfaces 18 in mutually facing relationship. The ends 20 of each core boss 16 protrude from the opposite major faces of each disc 12. The connecting tube 14 between each pair of discs 12 fits snugly over the protruding ends 20 of the facing core bosses in the adjacent discs. When the desired number of discs 12 are assembled with the connecting tubes 14 therebetween, the assembly is held together by fasteners 22 at the ends of tie rods 24 that extend through holes in the discs 12 at their corners (see FIG. 6). The present embodiment contemplates using tie rods that are threaded at their ends and, as the fasteners 22, nuts that are screwed down tightly against the outside surfaces of the end discs 12a and 12h to hold all of the discs 12 and connecting tubes 14 in place by compression. It will be appreciated that spacers between the discs 12 may be necessary to support the compressive forces exerted by the fasteners. These spacers may take any form, but conveniently they are tubes that fit over the tie rods between the discs 12 to positively establish a predetermined inter-disc spacing and prevent the discs from deforming under the compressive forces applied by the fasteners 22. The assembly can also include optional stiffener beams 26, shown in phantom in FIG. 1, to impart further rigidity to the assembly. The stiffener beams will be typically welded to the discs' peripheral surfaces, but other means of fastening can be used in accordance with the requirements of a particular application. Thus, while the strainer discs 12 and connecting tubes 14 are by themselves not sufficiently strong to support the strainer, the entire unit, when secured together with the structural tie rods 24 and the optional stiffener beams 26, is structurally self-supporting.

The strainer 10 further includes a suction pipe 28 welded to the protruding end of the core boss (not shown) extending through the disc 12h. In use, a flange 30 on the pipe 28 attaches to a cooperating flange on a pipe (not shown) leading to an ECCS pump, as described in U.S. Pat. No. 5,759,399. That is, the pipe 28 serves as a suction opening operatively connected to the interior of the immersed hollow strainer discs to draw cooling water external to the discs through the strainer perforations and into the ECCS. The other end of the strainer 10, formed by the outside major surface $12a_1$ of the end disc 12a, is closed; that is, the core boss for that disc does not extend through the disc surface $12a_1$. In another configuration, the core boss extending through the surface $12a_1$ can be closed by a plate (not shown) perforated with holes having the same size and pattern as the perforations in the remainder of the surface of the disc 12a.

In addition to the modular construction of the strainer 10, another feature that comprises an important aspect of the present invention is the contoured configuration of the major surfaces 18 of the discs 12. As explained in U.S. Pat. No. 5,759,399, a design issue for nuclear reactor strainers is maintaining proper fluid flow through the strainer in the presence of large amounts of debris. That patent proposes tailoring the strainer dimensions in a way that evens out the distribution of the debris over the surface area of the strainer, thereby maximizing strainer capacity. That approach has proved very effective in improving strainer performance, but the present invention can provide similar performance with a smaller strainer, thus utilizing available reactor space more efficiently.

To repeat a point made earlier, a nuclear reactor strainer must filter debris that can cause a very high head loss when captured by the strainer. The debris entrained in the ECCS flow typically contains large amounts of fibrous debris (from insulation destroyed in the course of the reactor accident) and also a range of sizes of particulates from other sources (paint chips, other insulation, oxide particles, etc.). The strainer perforations are sized to prohibit the passage of large material, although sufficiently small particulate material may pass through the strainer. However, fibrous debris beds trap particulates that would otherwise pass through the strainer. For some debris compositions, particles that are small enough to pass through the strainer perforations can be trapped by a thin layer of the fibrous debris that forms on the strainer surfaces. That is, the strainer becomes effectively coated with a thin layer of fibers that trap particulates, and the fiber with the trapped particulates prevents water from passing through this debris bed. This thin fibrous/particulate debris bed has a very high head loss (that is, it is very resistant to flow through it), since the characteristic area of the openings in the debris bed become extremely small. Known ECCS strainers all use flat perforated plates as strainer elements, as shown in prior art such as U.S. Pat. No. 5,696,801 and U.S. Pat. No. 5,935,439.

The strainer 10 incorporates a feature to alleviate that problem. As seen in FIG. 1, the major surface of each strainer disc 12 in the strainer 10 is contoured. The purpose of this contoured surface is to prevent fibrous debris from laying flat on the strainer surfaces, thereby to disrupt the formation of a flat bed of fibrous material that can trap small particulates and reduce the resulting severe head loss in flat plate strainers. FIG. 1 illustrates a preferred manner of contouring the strainer surfaces. In this embodiment a screen mesh 32 is attached to the major surface of each disc 12. The screen mesh 32 is a woven wire mesh cloth similar in construction to a window screen (although the screen mesh used with a strainer in a nuclear reactor is typically made of wire thicker than that used in a window screen with a coarser weave). The wire mesh cloth 32 is attached to the strainer discs 12 using suitable fasteners, such as rivets (not shown), at locations spaced around the disc surfaces. The wire mesh cloth can also be spot welded as needed to provide a secure attachment to the strainer disc surfaces. In another embodiment the wire mesh cloth can be bent around the discs, and/or spaced from the disc surface by spacers distributed on the disc surface. A possible configuration in that regard would hold the wire mesh cloth about 0.25 in. from the disc surface.

The exact dimensions of the screen mesh 32 for a particular application can be determined empirically depending on the type of debris expected to be encountered in the reactor installation incorporating the strainer 10. The general dimensions of a wire mesh cloth in accordance with this aspect of the invention are suggested by head loss tests run with a wire mesh cloth made from 0.135 in. diameter wire having mesh openings ¼ in. square and a wire mesh cloth with 0.120 in. diameter wire with mesh openings ⅜ in. square. These particular tests revealed that debris beds on the order of 10 mm thick, or five times thicker than the debris beds for a strainer with flat perforated strainer plates, still permitted water to pass easily through the plates. In the tests referred to here, wire mesh cloth having thicker wire and smaller mesh openings tended to exhibit less head loss than wire mesh cloth with larger openings. Those skilled in the art will appreciate that the wire mesh cloth configuration for optimum performance with a particular type of debris composition (that is, types and relative amounts of different debris components) may be determined by testing using simulated operating conditions and debris compositions expected to be encountered in actual operation. An exemplary protocol for such testing is discussed below in connection with a specific working example of the invention. (Those tests are slightly different from the tests referred to just above, in which the pressure across an sample strainer element was provided by a 16 ft. high column of water in a 6 in. diameter round pipe.)

Figure 3:
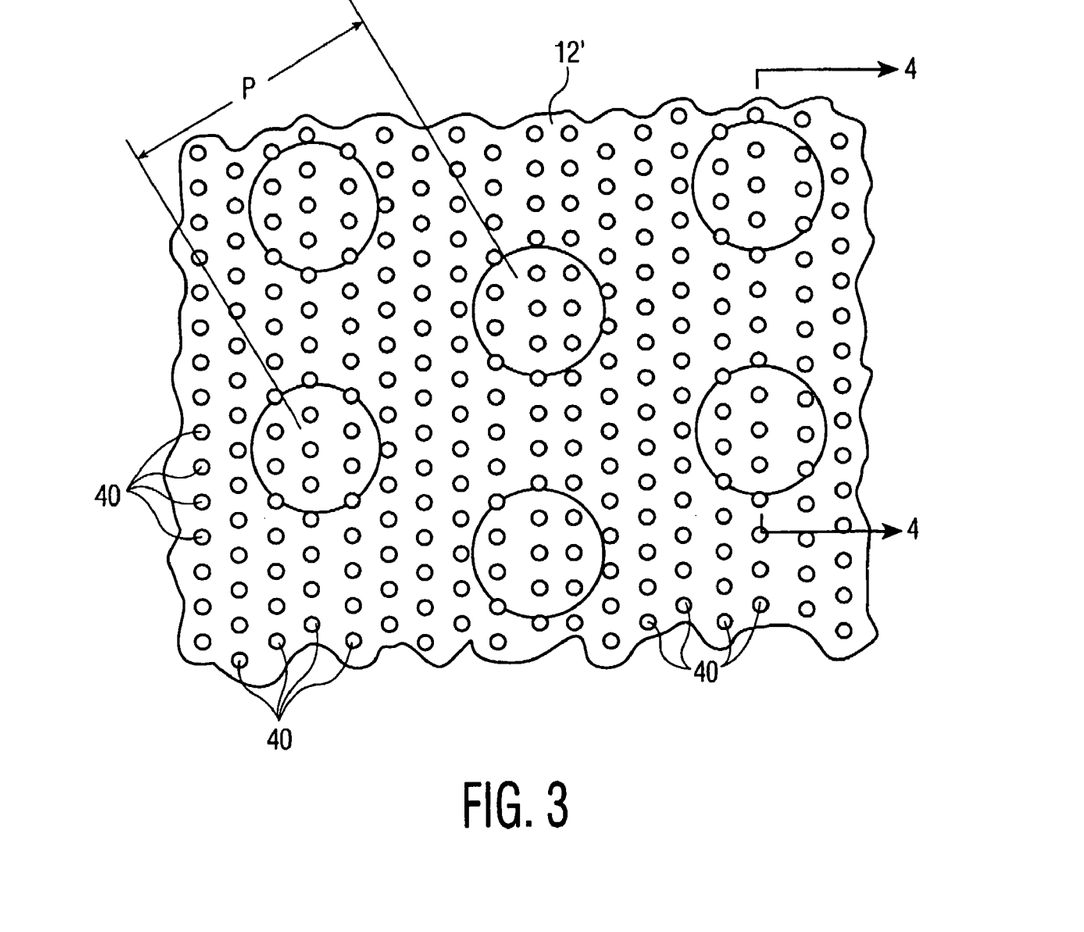
FIG. 3 is a schematic plan view of a portion of a strainer with a contoured surface in accordance with another preferred embodiment of the invention.
Figure 4:
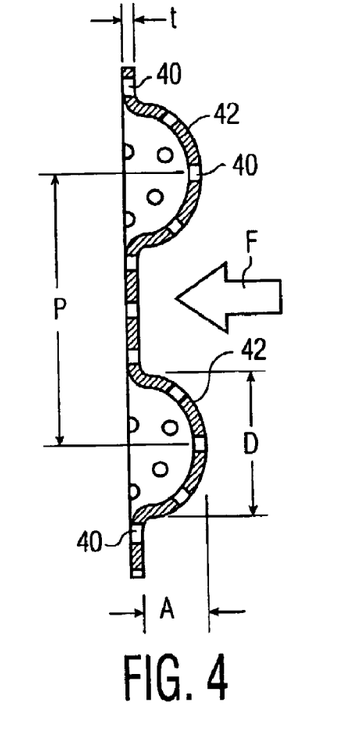
FIG. 4 depicts a section taken at line 4-4 of the strainer in FIG. 3.

FIGS. 3 and 4 illustrate a contoured strainer surface according to an alternate embodiment of the invention. FIG. 3 depicts in plan view a portion of a strainer surface 12', such as a major surface of one of the discs 12 of the strainer 10. Being drawn to a larger scale than FIGS. 1 and 2, FIG. 3 shows more clearly the perforations 40 in the strainer surface. (It will be understood that the surfaces of the discs 12 and the connecting tubes 14 are both perforated in this same manner, as suggested more schematically in FIGS. 1 and 2.) The surface treatment in FIG. 3 comprises a plurality of protrusions 42 that project from the surface of the disc against the direction of flow F through the strainer. The protrusions 42 are circular in planform, with a diameter D. Circular protrusions are easy to manufacture because they can be stamped with a suitable machine tool into a flat plate of an appropriate thickness t, which is typically the same dimension as the hole diameter, to form a strainer surface such as that depicted in FIG. 3. It is preferable that the tooling simultaneously form the perforations and the dimples, since punching the perforations and then dimpling the plate will likely deform the perforations, the diameters of which must be maintained within given tolerances. The protrusions 42 are generally hemispherical in cross section with a height A (the diameter of the hemisphere, or approximately D), with adjacent protrusions along a line being spaced at a pitch P. Those skilled in the art will appreciate that the protrusions can have other shapes and be spaced in other patterns. Ranges of typical protrusion dimensions are A=⅛ in. to ¾ in. and P=0.5 in. to 1.5 in., with preferred values for one particular debris combination that was tested being A=⅜ in. and P=1 in. However, as explained above, the exact values of A and P for a particular nuclear reactor application may be determined by appropriate testing.

Figure 5:
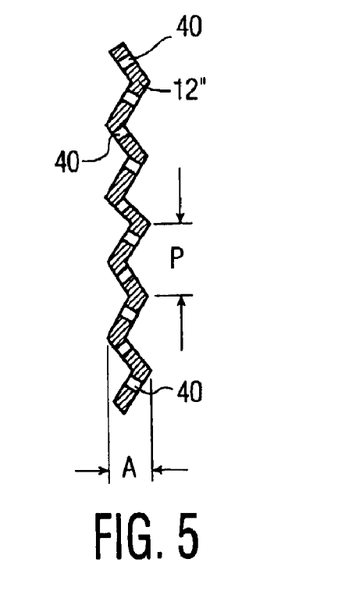
FIG. 5 is a cross section of a contoured surface in accordance with yet another embodiment of the invention.

Other modifications of this contour configuration are also possible. For example, the protrusions 42 could instead be dimples or depressions recessed into the disc surface in the direction of the flow (that is, oriented as if the flow were approaching the disc in the opposite direction from arrow F in FIG. 4). In addition, the surface could be comprised of a pattern of both recessed dimples and raised protrusions. FIG. 5 illustrates another contoured surface configuration that was tested and found to reduce the head loss across the strainer. FIG. 5 is a cross section of a corrugated disc 12" with a pitch P measured from peak to peak between corrugations. As with the embodiment depicted in FIGS. 3 and 4, a corrugated disc can be stamped from a flat blank using a suitable machine tool. For the reasons explained above, it is preferable to use tooling that forms the perforations and corrugations simultaneously, unless holes are punched in specific locations to account for the deformation of the holes. The height or magnitude of each corrugation is A. Tests were run on an exemplary corrugated disc in which P=½ in. and A=¼ in. As with the tests referred to above in connection with the wire mesh cloth surface treatment, the tests on this particular corrugated strainer element also showed that debris beds on the order of 10 mm thick, or five times thicker than the debris beds for a strainer with flat perforated strainer plates, permitted water to pass easily through the corrugated plates. Again, the exact corrugation configuration will have to be determined by testing under simulated operating conditions and debris compositions.

An aspect common to all of these contoured surface embodiments is that they prevent entrained fibrous material, that is, material comprising thread-like fibers, from laying flat on the strainer surface. While not wishing to be limited to any particular theory for why the present invention with a contoured strainer surface reduces head loss as compared to a flat surface, it is believed that preventing the fibers from laying flat on those portions of the strainer surface with perforations forces openings between the fibers to remain sufficiently large to prevent trapping of very small particulates. The surface contours of the embodiments depicted in the above figures all satisfy that criterion, in that they disrupt the formation of a flat bed of fibrous material.

Figure 6:
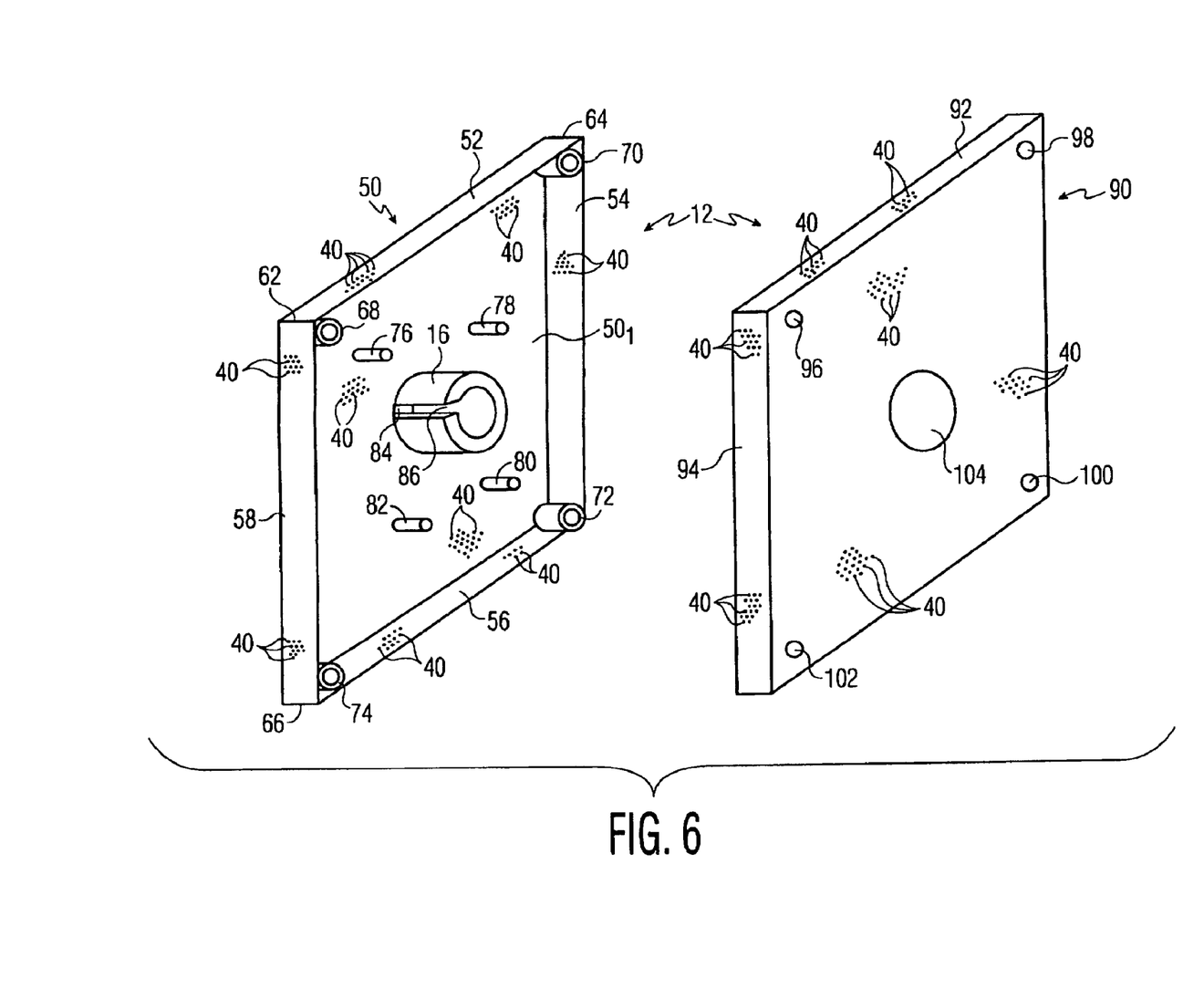
FIG. 6 is a exploded perspective view of a two-part modular strainer disc according to another aspect of the invention.

FIG. 6 is an exploded view of one of the modular discs 12 incorporated into the strainer 10. The disc 12 comprises a first part 50 with perforations on all of its surfaces. The first disc part 50 has a major surface $50_1$ and flanges 52, 54, 56 and 58 that are integral with the major surface $50_1$. The disc 12 is stamped from a generally rectangular perforated blank with the corners cut out so that when the periphery of the blank is bent up to form the flanges 52, 54, 56 and 58, they form seams where their edges meet. Three of the seams 62, 64 and 66 are shown in the figure; the fourth is hidden by a part to be described, and the seams are welded to form the body of the first disc part 50. A tie-rod boss 68, 70, 72, 74 is welded in place in each corner of the disc body. The tie-rod bosses reinforce openings (not shown) in the major surface $50_1$ that accept the tie rods 24 described above in connection with FIG. 1. The first disc part 50 also includes support spacers 76, 78, 80 and 82. These spacers comprise small studs welded to the inside of the major surface $50_1$ for a purpose described below. The core boss 16 is also welded into an opening 84 in the major surface. As described above in connection with FIG. 2, the core boss 16 protrudes slightly beyond the outside of the surface $50_1$. The core boss 16 includes a slot 86, also for a purpose described below in connection with the operation of the strainer 10.

The disc 12 also includes a second disc part 90, which can be conveniently fabricated in the same manner as the first disc part 50. In fact, the second disc part 90 is almost identical to the first disc part body. The main difference, other than omission of the bosses 68, 70, 72 and 74, and the studs 76, 18, 80 and 82, is that the second disc part 90 is slightly larger than the first disc part 50, so that the flanges of the second disc part (only flanges 92 and 94 are seen in the drawing) fit snugly over the flanges 52, 54, 56 and 58 of the first part. Although the perforations in the overlapping flanges may not line up exactly, this does not impair strainer performance because the edges of the discs formed by the flanges comprise a very small percentage of the total surface area of the strainer. In fact, in am alternative construction the flanges are not perforated, since that may facilitate fabrication of the disc parts.

Tie-rod openings 96, 98, 100 and 102 at the corners of the major surface $90_1$ of the second disc part 90 mate with the tie-rod bosses 68, 70, 72 and 74, and the core boss 16 passes through an opening 104 in the major surface $90_1$. The edges of the flanges 52, 54, 56 and 58 bear against the inside of the surface $90_1$ to establish the distance between the surfaces $50_1$ and $90_1$. The ends of the studs 76, 78, 80 and 80 also bear against the inside of the surface $90_1$ to maintain that distance constant when there is a pressure differential between the inside and outside of the disc during operation. The edges and studs, and the core boss 16, are dimensioned so that when the two disc parts 50 and 90 are assembled, the proximal end of the core boss passes through the opening 104 and protrudes slightly beyond the outside of the surface $90_1$, as described above in connection with FIG. 2. The disc parts 50 and 90 are secured together by welding the core boss 16 to the peripheral edge of the opening 104. It is generally unnecessary to further secure the two disc parts 50 and 90 together, because the tension placed on the through rods 24 secures the discs together at their peripheries.

The advantages of this modular construction will be immediately apparent. The discs 12 can readily be made in a variety of configurations to fit different applications. For example, although the major surfaces of the disc parts 50 and 90 are rectangular, they can easily be made trapezoidal to fit into the space available in the nuclear reactor where the strainer will be installed. The discs can, in fact, be any desired shape, whether polygonal or not or whether regular or not, and can be assembled into a strainer. In addition, it should be understood that the fabrication techniques described above in connection with FIG. 6 are exemplary only. Other forming methods and fastening techniques can be employed to provide a modular strainer in accordance with the present invention. In one variation, the flanges of the disc part 90 can fit inside the flanges of the disc part 50 (although the tie-rod bosses in that case must be slightly spaced from the disc part 50 flanges).

Furthermore, this strainer construction permits incorporation of the advantages of the strainer described in U.S. Pat. No. 5,759,399. That is, the strainer design described in that patent tailors the size and shape of the strainer discs and central core to distribute the flow through the strainer. The present invention provides a fabrication approach that facilitates tailoring the strainer disc sizes and shapes, while also regulating the core flow through the strainer. It will be apparent to those skilled in the art that the strainer described herein functions in accordance with the general operational principles discussed in U.S. Pat. No. 5,759,399, which discussion is incorporated herein by reference, in that cooling water is drawn by the ECCS pumps into the interiors of the discs 12, into the core bosses 16 through the slots 86, and out of the strainer through the suction opening provided by the pipe 28.

In the present invention, the slot 86 in each core boss 16 provides an aperture that acts as a core flow regulator in accordance with the discussion in U.S. Pat. No. 5,759,399. That patent describes a technique for regulating the core flow by changing the diameter of the central core along the strainer axis. By changing the size of the aperture from disc to disc, the core flow regulation discussed in that patent is achieved. In line with that discussion, in the present embodiment the slots 86 will get progressively larger for discs 12 more distant from the strainer outlet at the pipe 28 (see FIG. 1). That is, the width (circumferential extent) of the slot in the disc 12h will be larger than the width of the slot in the disc 12g, the width of the slot in the disc 12g will be larger than the width of the slot in disc 12f, etc.

Those skilled in the art will realize that flow regulation structure other than a slot in a core boss can be used for this function. For example, plural slots or discrete holes can be used, and instead of changing the size of a single slot, greater numbers of slots or holes can be used from disc to disc. In the illustrated embodiment, the core boss is a circular cylinder, but it can also have other cross sectional shapes and still function to regulate the flow from the disc's interior space into the strainer core at the central axis. For example, the core boss can be elliptical, square, rectangular, or any regular or irregular shape (polygonal or not), depending on the demands of the strainer installation. Nor do all of the core tubes or discs have to be the same shape. It will also be appreciated that the modular construction described herein will facilitate fabrication of stacked disc strainers with varying size discs, as described in U.S. Pat. No. 5,759,399. All of the features and operational characteristics described in that patent and mentioned in this description are incorporated by reference as if described in full herein.

Figure 7:
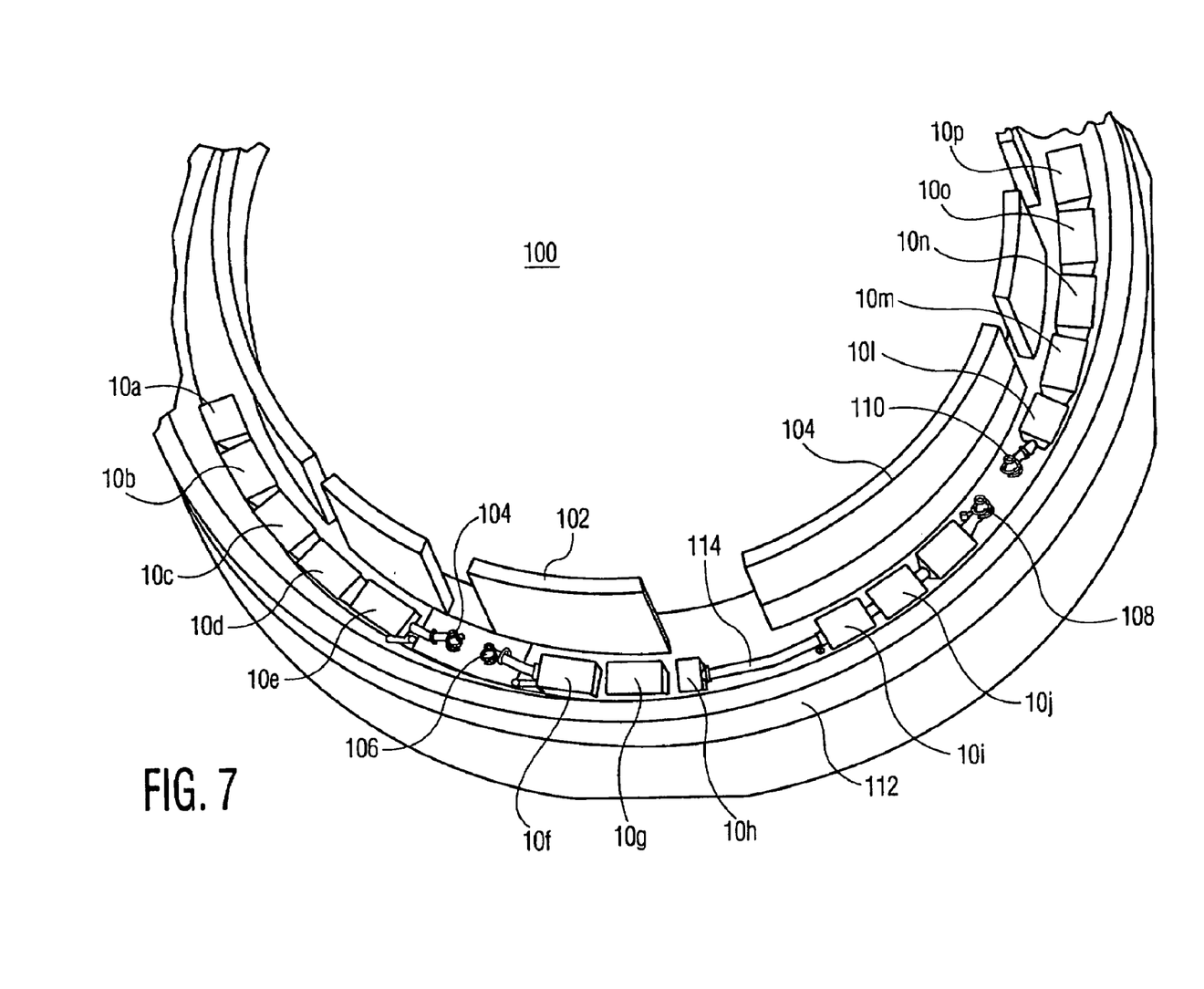
FIG. 7 is a perspective view of part of a pressure water reactor containment area with strainers according to the present invention.

FIG. 7 is a perspective view of part of a PWR containment area 100. When an accident occurs, the normally dry containment area floods with water, which thus forms a reservoir from which water is drawn to cool the reactor core. A plurality of strainers 10a, 10b, 10c, 10d, 10e, 10f, 10g, 10h, 10i, 10j, 10k, 10l, 10m, 10n, 10o, and 10p are disposed in the containment area behind a shield wall 102. The strainers are connected by pipes 104, 106, 108 and 110 to ECCS pumps (not shown) below the floor 112 of the containment area. The strainers 10a, 10b, 10c, 10d and 10e are connected in series to the pipe 104. Likewise, the strainers 10f, 10g and 10h are connected in series to the pipe 106; the strainers 10i, 10j and 10k are connected in series to the pipe 108, and the end discs of the strainers 10h and 10i are connected by the pipe; and the strainers 10l, 10m, 10n, 10o and 10p are connected in series to the pipe 110. It will be appreciated that the end discs 12a of the strainers 10b, 10c, 10d and 10e will have core tubes configured to accept a pipe similar to the suction pipe 28 attached to the disc 12h shown in FIG. 1. This is the case for all of the strainers connected to pipes at both ends of the strainer, and this design variation from one strainer to the next is readily incorporated because of the strainer's modular design. Another aspect of the enhanced versatility of the modular strainer construction according to the invention is also readily apparent in FIG. 7, which shows different size strainers at different locations in the containment area depending on the size constraints at a particular location. For example, the strainer 10h is shorter than other strainers because the reactor design specifications call for it to fit into a smaller envelope. In addition, the discs comprising the strainers need not be rectangular shape as shown in FIG. 6, as illustrated by the trapezoidal discs shown in FIG. 7.

In operation, the containment area 100 of the PWR shown in FIG. 7 floods in the event of a LOCA, thus forming a cooling water reservoir. The ECCS pumps apply suction to the pipes 104, 106, 108 and 110, which in turn draw water from the containment area through the strainers 10. After a LOCA, the water in the containment area 110 will normally be filled with debris in the form of fibrous elements from destroyed insulation, fine particulate matter and other debris such as paint chips. In accordance with the principles discussed above, and in U.S. Pat. No. 5,759,399, the core flow in the strainers is regulated to distribute the debris over the surface area of the individual strainers by the action of the flow regulating slots 86 therein. Furthermore, by incorporating contoured surfaces into the discs in accordance with the invention, the head loss through the strainers is greatly reduced in order to provide adequate coolant flow.

WORKING EXAMPLE

Figure 8:
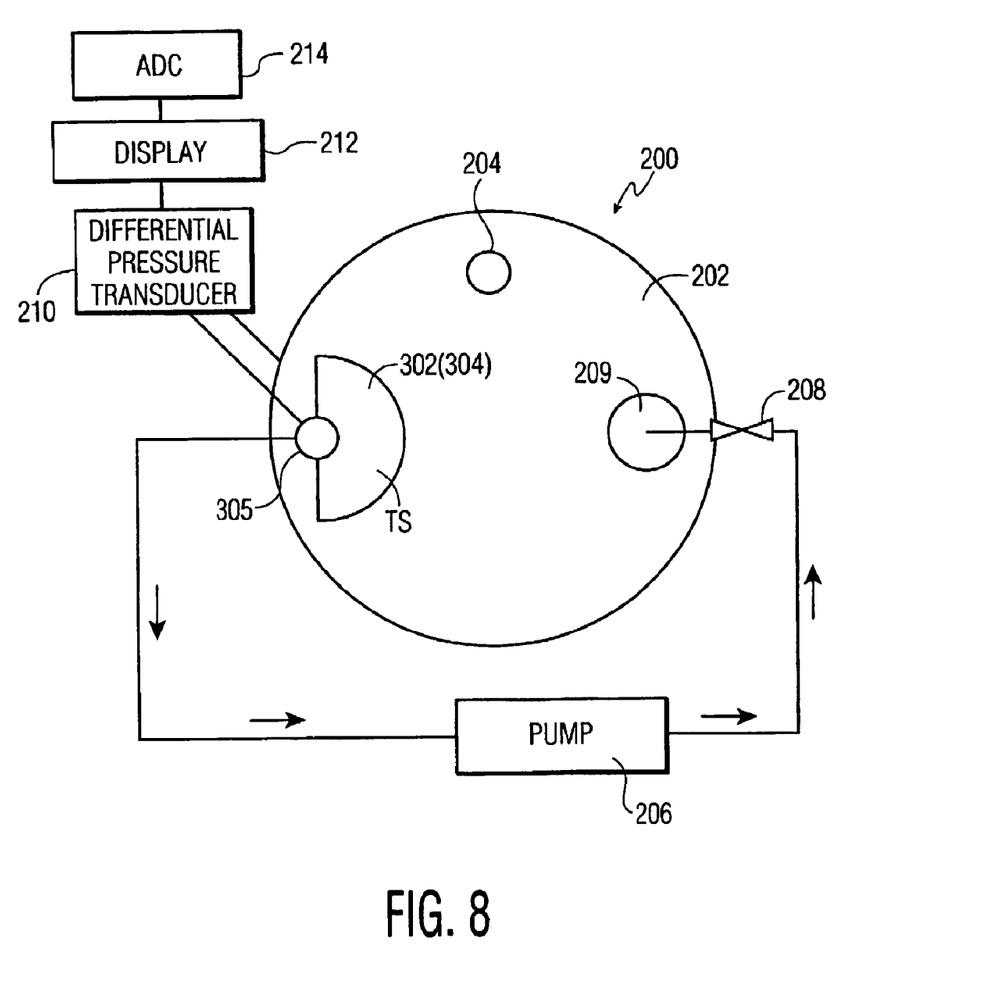
FIG. 8 is a schematic illustration of a test set up used to perform tests on a working example of the present invention.

FIG. 8 schematically illustrates a test set up 200 that validates the concepts underlying the contoured strainer surface aspect of the present invention, and suggests a test protocol for determining the parameters of a contoured surface in accordance with the present invention for a given reactor application. A tank 202 simulates a reactor coolant reservoir. In the tests, materials simulating the debris encountered in a LOCA were introduced into the tank 202. An electrically powered propeller functions as a stirrer 204 to maintain the test debris in suspension in the test liquid in the tank 202. A pump array 206, simulating a reactor ECCS pump, draws water through a test strainer rig TS and circulates it back to the tank 202 through an adjustable control valve 208 that enables regulation of the fluid flow rate. The control valve outlet is introduced into a generally cylindrical baffle 209 at the bottom of the tank to inhibit the establishment of a flow pattern between the valve outlet in the tank 202 and the test strainer rig TS. Instrumentation includes a Rosemount 1151 DP differential pressure transducer 210 connected to a Sensotec GMA display 212. The display provides a voltage signal, indicative of the pressure differential sensed by the pressure transducer, to a Dataq DI-220 12-bit analog-to-digital converter 214. The resulting digital signal is introduced to a data acquisition program stored on a computer (not shown). The tank 202 is approximately 7 ft. in diameter and 30 in. deep. The pump array includes three Hayward® pumps, each having a maximum flow rate of approximately 100 gallons per minute.

The test strainer rig TS comprised two semicircular hollow discs 302, 304 with their major surfaces parallel to each other. (The disc 304 is beneath the disc 302 and in fact cannot be seen in FIG. 8.) The facing major surfaces of the discs are perforated to simulate the perforated surfaces of a nuclear reactor strainer, such as the strainer 10 shown above in FIG. 1. The discs are mounted with a 56 mm gap between their parallel facing surfaces. The discs have an outside diameter of 3 ft. and a central semicircular cutout with a diameter of 10.75 in. A suction pipe 305 is placed in communication with the hollow interiors of both discs, with flow being permitted to enter the core tube at the gap between the discs 302 and 304 through perforations as discussed above with reference to connecting tubes 14. The three pumps of the pump array 206 are connected to a pipe (not shown) communicating with the pipe 305 to draw water from the tank 202, into the hollow interiors of the discs 302 and 304, and into the pipe 305. The non-facing major surfaces of the discs are solid (that is, not perforated) to force fluid to flow into the gap between the discs, through the perforations, and into the suction pipe, thus simulating the flow between facing perforated disc surfaces in a strainer installed in a reactor. The high pressure end of the pressure transducer 210 is attached to the tank wall, and the low pressure end is located to sense the pressure in the pipe connected to the pipe 305, so that the pressure differential signal from the pressure transducer represents the pressure drop across the perforated discs. The water was at room temperature.

The tank was filled to a depth of 27 inches and a mixture of mineral wool and calcium silicate insulation was tested in a mass ratio of 1.3 calcium silicate to mineral wool. A simulated debris load was prepared in accordance with procedures established by the Boiling Water Reactor Owners Group in which the mineral wool was shredded using a leaf shredder and the calcium silicate was ground by hand into a fine powder of small particulates. All the debris was soaked to ensure it could be entrained into the strainer. Testing was conducted to compare the performance of a perforated plate with protrusions to that of a flat perforated plate with different amounts of debris on the strainer. In a series of tests, three different amounts of the debris mixture, representing thin, medium, and thick debris loads, were tested on discs 302 304 with both a flat perforated surface and a surface with protrusions. These tests corresponded to 0.75 lb., 1.5 lb., and 2.25 lb. of mineral wool with a corresponding amount of calcium silicate. The effect of the protrusions significantly reduced head loss, under identical conditions in all cases. The ratio of the head loss for the perforated plate with protrusions compared to the head loss for the flat perforated plate was 0.56, 0.19, and 0.5 for the three cases, respectively. Thus, the protrusions reduced the head loss across the strainer by a factor of about 2-5.

SUMMARY

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A nuclear power plant emergency core cooling system that circulates cooling water during a power plant loss of cooling accident, said cooling system having therein a strainer comprising:
    a strainer element for immersion in the cooling water during the loss of cooling accident, said strainer element including at least two strainer members, each said strainer member having a continuous major surface with a plurality of perforations therethrough distributed on at least a portion of said major surface for straining fibrous debris from cooling water passing through said perforations during the loss of cooling accident, wherein said strainer members are disposed with said major surfaces in spaced apart relation to form a hollow interior space with external sides of said major surfaces facing the cooling water during the loss of cooling accident; and
    a suction opening operatively connected between an emergency core cooling system pump and said interior space for drawing the cooling water into said interior space from said external sides through said perforations,
    wherein said external sides of said strainer member major surfaces have contouring members on at least said perforated portions of said major surfaces, and said contouring members contact fibrous debris in said cooling water during the loss of cooling accident to disrupt the formation on said perforations of a flat bed of fibrous debris that can trap particulate material small enough to pass through said perforations.

2. A nuclear power plant emergency core cooling system as in claim 1, wherein said contouring members comprise wire mesh cloth covering at least said perforated portions of said external sides of said major surfaces.

3. A nuclear power plant emergency core cooling system, as in claim 1, wherein said contouring members comprise a plurality of protrusions extending from at least said perforated portions of said external sides of said major surfaces.

4. A nuclear power plant emergency core cooling system as in claim 3, wherein said protrusions are substantially uniform and are raised above said external sides of said major surfaces in a regular repeating pattern.

5. A nuclear power plant emergency core cooling system as in claim 4, wherein said protrusions are substantially hemispherical.

6. A nuclear power plant emergency core cooling system as in claim 4, further comprising a plurality of substantially uniform depressions alternating in said pattern with said protrusions, said depressions being substantially hemispherical.

7. A nuclear power plant emergency core cooling system as in claim 1, wherein said contouring members comprise a plurality of substantially similar corrugations in at least said perforated portions of said major surfaces.

8. A nuclear power plant emergency core cooling system as in claim 1, further comprising:
    a plurality of said strainer elements, each including substantially planar said strainer members defining a hollow disc, wherein said strainer includes plural said discs disposed in a stack with an external side of a major surface of one said disc facing an external side of a major surface of an adjacent said disc; and
    a plurality of connecting tubes disposed between said discs for placing said interior spaces of said discs in fluid communication, wherein said suction opening comprises a connection to said interior space of one of said discs at one end of said stack.

9. A nuclear power plant emergency core cooling system as in claim 8, wherein said connecting tubes are disposed along edges of said discs.

10. A nuclear power plant emergency core cooling system as in claim 8, wherein said connecting tubes are disposed proximate to a center of said major surfaces of said discs.

11. A nuclear power plant emergency core cooling system as in claim 8, wherein said major surfaces of said discs are generally circular.

12. A nuclear power plant emergency core cooling system as in claim 8, wherein said major surfaces of said discs are polygonal.

13. A nuclear power plant emergency core cooling system as in claim 8, wherein said connecting tubes are generally circular in cross section.

14. A nuclear power plant emergency core cooling system as in claim 8, wherein:
    said stack is disposed along an axis;
    each said disc includes a first disc part having a fluid opening and a second disc part having a fluid opening, said first and second disc parts forming said disc with a fluid opening formed at said axis by said fluid openings in said disc parts;
    said suction opening comprises said fluid opening said at said disc at said one end of said stack;
    said connecting tubes place said fluid openings of facing said discs in fluid communication; and at least one structural member secures said discs together and holds said connecting tubes in place between said discs.

15. A nuclear power plant emergency core cooling system as in claim 14, wherein each said disc includes a core flow regulator extending between said fluid openings in said first and second disc parts for regulating fluid flow from said interior space into said connecting tubes.

16. A nuclear power plant emergency core cooling system as in claim 15, wherein:
   said fluid openings are disposed proximate to a center of said major surfaces of said disc parts to define a central axis of said strainer; and
   said core flow regulator comprises a tubular core boss secured in said fluid openings of said disc parts and having at least one aperture placing said interior space in fluid communication with a central strainer core formed by said tubular core bosses and said connecting tubes.

17. A nuclear power plant emergency core cooling system as in claim 16, wherein said aperture is a slot extending generally axially along said core boss.

18. A nuclear power plant emergency core cooling system as in claim 16, wherein said aperture is smaller in said core boss in a said disc further from said one end of said stack than in said adjacent disc closer to said one end of said stack.

19. A nuclear power plant emergency core cooling system as in claim 14, wherein:
   said first and second disc parts each include a substantially planar, perforated major surface having the same planform with four straight sides and flanges at the periphery of said planform, said flanges of one said disc part fitting within said flanges of the other said disc part to form sides of each said disc and said disc parts including corner openings proximate to the corners of said four-sided planform;
   at least one of said disc parts includes support spacers attached to said interior major surface thereof and bearing against said facing interior major surface of the other of said disc part; and
   said strainer includes a plurality of said structural members, each comprising a tie rod extending through said corner openings and urging said strainer discs together with said connecting tubes compressed therebetween.

20. A nuclear power plant emergency core cooling system as in claim 19, wherein said planform is rectangular.

21. A nuclear power plant emergency core cooling system as in claim 19, wherein at least one of each of said first and second disc parts includes a reinforcing boss at each said corner opening.

22. A nuclear power plant emergency core cooling system as in claim 21, wherein said plurality of structural members further includes stiffener beams connected to said periphery of said strainer discs.

23. A nuclear power plant emergency core cooling system as in claim 19, wherein each said disc includes a tubular core boss secured in said fluid openings of said disc parts, said core boss having at least one aperture placing said interior space of said disc in fluid communication with a central strainer core formed by said tubular core bosses and said connecting tubes and regulating fluid flow from said interior space to said central strainer core.

24. A nuclear power plant emergency core cooling system as in claim 23, wherein said tubular core boss comprises a circular cylinder with a slot extending generally axially along said core boss, and ends of said core boss protrude axially from said discs and extend into said connecting tubes.

25. A nuclear power plant emergency core cooling system that circulates cooling water during a power plant loss of cooling accident, said cooling system having therein a strainer comprising:
   a strainer element for immersion in the cooling water during the loss of cooling accident, said strainer element including at least two strainer members, each said strainer member having a continuous major surface with a plurality of perforations therethrough distributed on at least a portion of said major surface for straining fibrous debris from cooling water passing through said perforations during the loss of cooling accident, wherein said strainer members are disposed with said major surfaces in spaced apart relation to form a hollow interior space with external sides of said major surfaces facing the cooling water during the loss of cooling accident; and
   a suction opening operatively connected between an emergency core cooling system pump and said interior space for drawing the cooling water into said interior space from said external sides through said perforations,
   wherein said external sides of said major surfaces have on at least said perforated portions of said major surfaces at least one of a wire mesh cloth covering said portions, a plurality of protrusions on said portions, a plurality of protrusions on said portions and a plurality of depressions in said portions alternating in a pattern with said protrusions, and a plurality of corrugations on said portions.

26. A nuclear power plant emergency core cooling system as in claim 25, further comprising:
   a plurality of said strainer elements, each including substantially planar said strainer members defining a hollow disc, wherein said strainer includes plural said discs disposed in a stack with an external side of a major surface of one said disc facing an external side of a major surface of an adjacent said disc; and
   a plurality of connecting tubes disposed between said discs for placing said interior spaces of said discs in fluid communication, wherein said suction opening comprises a fluid connection to said interior space of one of said discs at one end of said stack.

* * * * *